(12) United States Patent
Edme et al.

(10) Patent No.: US 9,091,783 B2
(45) Date of Patent: Jul. 28, 2015

(54) COMPUTING A CALIBRATION TERM BASED ON COMBINING DIVERGENCE DATA AND SEISMIC DATA

(75) Inventors: Pascal Edme, Cambridge (GB); Everhard Muyzert, Girton (GB)

(73) Assignee: WESTERNGECO L.L.C., Houston, TX (US)

( * ) Notice: Subject to any disclaimer, the term of this patent is extended or adjusted under 35 U.S.C. 154(b) by 964 days.

(21) Appl. No.: 12/939,331

(22) Filed: Nov. 4, 2010

(65) Prior Publication Data

US 2012/0113749 A1 May 10, 2012

(51) Int. Cl.
*G01V 1/00* (2006.01)
*G01V 1/28* (2006.01)

(52) U.S. Cl.
CPC .............. *G01V 1/28* (2013.01); *G01V 2210/67* (2013.01)

(58) Field of Classification Search
CPC .............................. G01V 1/28; G01V 2210/67
USPC .......... 181/108, 401, 402; 367/13, 21, 22, 24, 367/25, 38, 62, 65, 74, 166, 171, 178, 43
See application file for complete search history.

(56) References Cited

U.S. PATENT DOCUMENTS

| | | | |
|---|---|---|---|
| 3,722,751 A | 3/1973 | Bisciglia | |
| 3,934,218 A | 1/1976 | Babb | |
| 4,134,097 A | 1/1979 | Cowles | |
| 4,163,206 A | 7/1979 | Hall, Jr. | |
| 4,334,296 A | 6/1982 | Hall, Jr. | |
| 4,599,713 A | 7/1986 | Rudaz | |
| 4,890,264 A | 12/1989 | Crews | |
| 4,937,794 A * | 6/1990 | Marschall et al. | 367/21 |
| 4,979,150 A | 12/1990 | Barr | |
| 4,996,675 A | 2/1991 | Beauducel | |
| 5,189,644 A * | 2/1993 | Wood | 367/38 |
| 5,235,554 A * | 8/1993 | Barr et al. | 367/13 |
| 5,555,530 A | 9/1996 | Meehan | |
| 5,621,699 A * | 4/1997 | Rigsby et al. | 367/22 |
| 5,648,938 A | 7/1997 | Jakubowicz | |
| 5,774,417 A | 6/1998 | Corrigan et al. | |
| 6,381,544 B1 | 4/2002 | Sallas | |
| 6,442,304 B1 | 8/2002 | Crawley | |
| 6,446,009 B1 | 9/2002 | Baeten | |

(Continued)

FOREIGN PATENT DOCUMENTS

EP 0736781 A1 9/1996
FR 2738642 A1 3/1997

(Continued)

OTHER PUBLICATIONS

Edme, et al., Near-Surface S-wave velocity estimation from P-wave polarization analysis, SEG Houston 2009 International Exposition and Annual Meeting, pp. 4289-4293.
Edme, et al., Receiver Function Decomposition of OBC Data : Theory, Geophysical Journal International, 2009, pp. 966-977, vol. 177.

(Continued)

*Primary Examiner* — Daniel L Murphy

(57) ABSTRACT

Divergence data is received from a divergence sensor and seismic data is received from seismic sensors, where the divergence sensor and seismic sensors are part of a sensor assembly. A calibration term is computed based on combining the divergence data and the seismic data, where the calibration term includes a first parameter that is related to a characteristic of the sensor assembly, and a second parameter that is related to a characteristic of a near-surface subterranean medium.

25 Claims, 6 Drawing Sheets

(56) References Cited

U.S. PATENT DOCUMENTS

| | | |
|---|---|---|
| 6,584,038 B2 * | 6/2003 | Meunier .................. 367/25 |
| 6,903,999 B2 | 6/2005 | Curtis et al. |
| 6,932,185 B2 | 8/2005 | Bary |
| 6,961,283 B2 | 11/2005 | Kappius |
| 7,082,079 B2 | 7/2006 | Woo |
| 7,142,481 B1 | 11/2006 | Metzbower |
| 7,359,283 B2 | 4/2008 | Vaage et al. |
| 7,551,517 B2 | 6/2009 | Berg |
| 8,396,668 B2 | 3/2013 | Robertsson |
| 8,520,469 B2 | 8/2013 | Ronnow |
| 8,665,671 B2 | 3/2014 | Muyzert et al. |
| 8,712,694 B2 | 4/2014 | Edme et al. |
| 2008/0221801 A1 | 9/2008 | Craft et al. |
| 2011/0080808 A1 | 4/2011 | Muyzert |
| 2011/0082647 A1 | 4/2011 | Edme |
| 2011/0085417 A1 | 4/2011 | Ronnow |
| 2011/0249530 A1 | 10/2011 | Liu |
| 2012/0035852 A1 | 2/2012 | Edme |

FOREIGN PATENT DOCUMENTS

| | | | |
|---|---|---|---|
| GB | 1256304 | 12/1971 | |
| GB | 2414299 A | 11/2005 | |
| GB | 2456313 A * | 7/2009 | ............... G01V 1/18 |
| WO | 2010082131 A2 | 7/2010 | |

OTHER PUBLICATIONS

Soubaras, Ocean Bottom Hydrophone and Geophone Processing, SEG Expanded Abstracts, 1996, pp. 24-27 vol. 15.

International Search Report of PCT Application No. PCT/US2011/057670 dated May 4, 2012.

Dey et al., "Noise suppression on Geophone data using microphone measurements", CREWES, Research Report vol. 12 (2000) http://www.crewes.org/ForOurSponsors/ResearchReports/2000/2000-08.pdf.

Greensted, "The Lab Book Pages: Delay Sum Beamforming", Oct. 2012, The Lab Book Pages, pp. 1-9, http://www.labbookpages.co.uk/audio/beamforming/delaySum.html.

* cited by examiner

COMPUTING A CALIBRATION TERM BASED ON COMBINING DIVERGENCE DATA AND SEISMIC DATA

BACKGROUND

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure.

The seismic waves generated by a seismic source travel into the subterranean structure, with a portion of the seismic waves reflected back to the surface for receipt by seismic receivers (e.g., geophones, accelerometers, etc.). These seismic receivers produce signals that represent detected seismic waves. Signals from the seismic receivers are processed to yield information about the content and characteristic of the subterranean structure.

A typical land-based seismic survey arrangement includes deploying an array of seismic receivers on the ground with the seismic receivers provided in an approximate grid formation. Most such survey arrangements have only seismic receivers oriented in the vertical direction. Some seismic surveys use multi-component seismic receivers or geophones that enable the measurement of an incoming wavefield (in velocity or acceleration) in three orthogonal directions (vertical z, horizontal inline x, and horizontal crossline y).

SUMMARY

Divergence data is received from a divergence sensor and seismic data is received from seismic sensors, where the divergence sensor and seismic sensors are part of a sensor assembly. A calibration term is computed based on combining the divergence data and the seismic data, where the calibration term includes a first parameter that is related to a characteristic of the sensor assembly, and a second parameter that is related to a characteristic of a near-surface subterranean medium.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
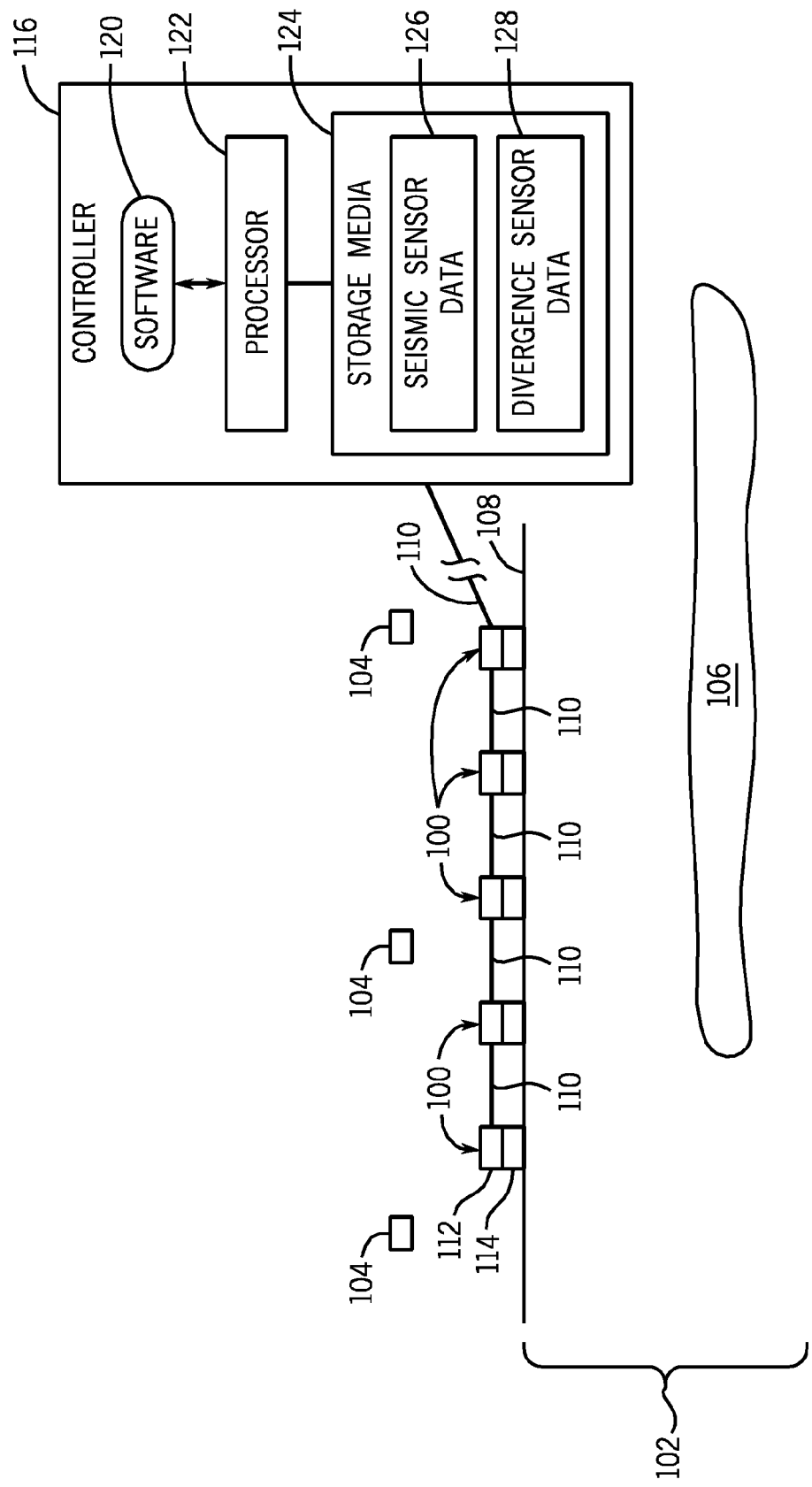
FIG. 1 is a schematic diagram of an example arrangement of sensor assemblies that can be deployed to perform land-based seismic surveying, according to some embodiments.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to certain orientations, such terms may refer to a left to right, right to left, or diagonal relationship as appropriate.

In accordance with some embodiments, a survey arrangement for performing land-based seismic surveying includes sensor assemblies. Each of some or all of the sensor assemblies includes multiple components, including a seismic sensor and a divergence sensor. More specifically, according to some implementations, a sensor assembly can include multiple seismic sensors (e.g., multiple geophones) and a divergence sensor. In some implementations, the divergence sensor is formed using a container filled with a material in which a pressure sensor (e.g., a hydrophone) is provided. The material in which the pressure sensor is immersed can be a liquid, a gel, or a solid such as sand or plastic.

The seismic sensors are used to measure a response of a subterranean structure to seismic signal(s) produced by one or more seismic sources. The pressure sensor in such an arrangement is able to record a seismic divergence response of a subsurface. The measurement of the divergence response can be used for various purposes, including mitigation of horizontal noise, such as ground-roll noise. Ground-roll noise refers to seismic waves produced by seismic sources that travel generally horizontally along a ground surface towards seismic receivers. These horizontally traveling seismic waves, such as Rayleigh waves or Love waves, are undesirable components that can contaminate seismic data. Other possible uses of the divergence response measurement are discussed below.

In accordance with some embodiments, divergence data from the divergence sensor and seismic data from the seismic sensors of a sensor assembly are combined to estimate a calibration term that depends on near-surface properties of the subterranean structure and a characteristic of the sensor assembly (which depends in part on coupling between the sensor assembly and the ground). More specifically, the estimated calibration term includes a first parameter that is related to a characteristic of the sensor assembly, and a second parameter that is related to a characteristic of a near-surface subterranean medium. The potential applications of the estimated calibration term include one or more of the following: near-surface characterization, sensor coupling characterization, seismic wave field regularization or interpolation, wavefield decomposition, or other applications. The type of application that can be performed depends on what types of a priori information is available for the survey arrangement (discussed further below).

In accordance with some embodiments, the calibration term that is computed is $K_D K_S$. The parameter $K_D$ converts pressure fluctuations outside the divergence sensor into pressure fluctuations inside the divergence sensor. Thus, $K_D$ is related to a characteristic of the sensor assembly that includes the divergence sensor. In implementations where the divergence sensor has a container in which a pressure sensing element is positioned, the parameter $K_D$ converts pressure fluctuations outside the container into pressure fluctuations inside the container. In practice, the parameter $K_D$ may also include terms to compensate for the fact that the divergence sensor and the seismic sensors have different impulse responses and different coupling with the ground. For example, $K_D = K_{cal} K_{coup}$, where $K_{cal}$ compensates for the fact that the divergence and seismic sensors have different impulse responses (among others, different electric amplification, etc.) and $K_{coup}$ compensates for the fact that the divergence and seismic sensors have different coupling with the ground.

FIG. 1 is a schematic diagram of an arrangement of sensor assemblies 100 that are used for land-based seismic surveying. The sensor assemblies 100 are deployed on a ground surface 108 (in a row or in an array). A sensor assembly 100 being "on" a ground surface means that the sensor assembly 100 is either provided on and over the ground surface, or buried (fully or partially) underneath the ground surface such that the sensor assembly 100 is with 10 meters of the ground surface. The ground surface 108 is above a subterranean structure 102 that contains at least one subterranean element 106 of interest (e.g., hydrocarbon reservoir, freshwater aquifer, gas injection zone, etc.). One or more seismic sources 104, which can be vibrators, air guns, explosive devices, and so forth, are deployed in a survey field in which the sensor assemblies 100 are located. The one or more seismic sources 104 are also provided on the ground surface 108.

Activation of the seismic sources 104 causes seismic waves to be propagated into the subterranean structure 102. Alternatively, instead of using controlled seismic sources as noted above to provide controlled source or active surveys, some embodiments can also be used in the context of passive surveys. Passive surveys use the sensor assemblies 100 to perform one or more of the following: (micro)earthquake monitoring; hydro-frac monitoring where microearthquakes are observed due to rock failure caused by fluids that are actively injected into the subsurface, such as a hydrocarbon reservoir; and so forth.

Seismic waves reflected from the subterranean structure 102 (and from the subterranean element 106 of interest) are propagated upwardly towards the sensor assemblies 100. Seismic sensors 112 (e.g., geophones, accelerometers, etc.) in the corresponding sensor assemblies 100 measure the seismic waves reflected from the subterranean structure 102. Moreover, the sensor assemblies 100 further include divergence sensors 114 that are designed to measure a divergence response.

In some implementations, the sensor assemblies 100 are interconnected by an electrical cable 110 to a controller 116. Alternatively, instead of connecting the sensor assemblies 100 by the electrical cable 110, the sensor assemblies 100 can communicate wirelessly with the controller 116. In some implementations, intermediate routers or concentrators may be provided at intermediate points of the network of sensor assemblies 100 to enable communication between the sensor assemblies 100 and the controller 116.

The controller 116 shown in FIG. 1 further includes processing software 120 that is executable on one or more processors 122. The processor(s) 122 is (are) connected to storage media 124 (e.g., one or more disk-based storage devices and/or one or more memory devices). In the example of FIG. 1, the storage media 124 is used to store seismic sensor data 126 communicated from the seismic sensors 112 of the sensor assemblies 100 to the controller 116, and to store divergence data 128 communicated from the divergence sensors 114 of the sensor assemblies 100.

In operation, the software 120 is used to process the seismic sensor data 126 and the divergence data 128. The divergence data 128 is combined with the seismic sensor data 126, using techniques discussed further below, to attenuate noise in the seismic sensor data 126 (to produce a cleansed version of the seismic sensor data). The software 120 can then produce an output to characterize the subterranean structure 102 based on the cleansed seismic sensor data 126.

Figure 2:
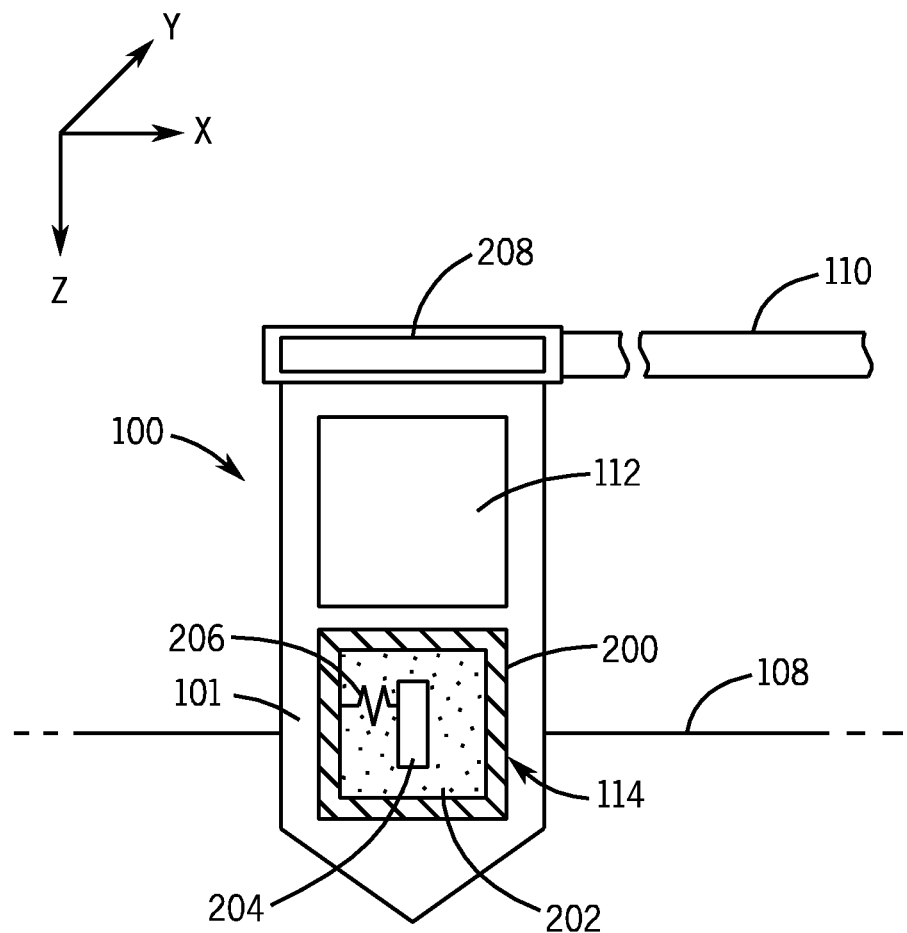
FIG. 2 is a schematic diagram of a divergence sensor in a sensor assembly according to some embodiments.

A sensor assembly 100 according to some embodiments is depicted in greater detail in FIG. 2. The seismic sensors 112 in the sensor assembly can be geophones for measuring particle velocity induced by seismic waves in the subterranean structure 102, or alternatively, each seismic sensor 112 can be an accelerometer for measuring acceleration induced by seismic waves propagated through the subterranean structure 102.

In some embodiments, the seismic sensors 112 can include a vertical component seismic sensor for measuring seismic waves in the vertical direction (represented by axis z in FIG. 1). Alternatively or in addition, the seismic sensors 112 can detect seismic waves in generally horizontal directions, such as the x or y directions that are generally parallel to the ground surface 108.

Although the seismic sensors 112 and divergence sensor 114 are depicted in FIG. 2 as being in the same housing 101, in alternative implementations, the divergence sensor 114 of the sensor assembly 100 can be physically spaced apart from the seismic sensors 112 by some predetermined distance.

The divergence sensor 114 has a closed container 200 that is sealed. The container 200 contains a volume of liquid 202 (or other material such as a gel or a solid such as sand or plastic) inside the container 200. Moreover, the container 200 contains a hydrophone 204 (or other type of pressure sensor) that is immersed in the liquid 202 (or other material). In the ensuing discussion, reference is made to the hydrophone 204 that is immersed in the liquid 202—note that in alternative embodiments, other types of pressure sensors can be immersed in other types of material. The hydrophone 204 is mechanically decoupled from the walls of the container 200. As a result, the hydrophone 204 is sensitive to just acoustic waves that are induced into the liquid 202 through the walls of the container 200. To maintain a fixed position, the hydrophone 204 is attached by a coupling mechanism 206 that dampens propagation of acoustic waves through the coupling mechanism 206. Examples of the liquid 202 include the following: kerosene, mineral oil, vegetable oil, silicone oil, and water. In other embodiments, other types of liquids can be employed. A liquid with a higher viscosity can be used to change the sensitivity to different types of waves, including P (compression) waves, S (shear) waves, Rayleigh waves, and Love waves. As further shown in FIG. 2, the sensor assembly 100 also includes electronic circuitry 208 that is electrically coupled to both the seismic sensor 112 and the divergence sensor 114. The electronic circuitry 208 can include storage elements, processing elements, and communications elements for communicating data acquired by the seismic sensors 112 and divergence sensor 114 over the electrical cable 110 to the controller 116 (FIG. 1).

As depicted in FIG. 2, the seismic sensors 112 are positioned above and external to the container 200 of the divergence sensor 114. Alternatively, the seismic sensors 112 can have some other arrangement with respect to the divergence sensor 114. At least a portion of the divergence sensor 114 is below the ground surface 108, such that the hydrophone 204 is at or below the ground surface 108, but not above the ground surface 108. When planted, the divergence sensor 114 of the sensor assembly 100 is firmly in contact with the earth medium underneath the ground surface 108, which improves data quality of signals acquired by the hydrophone 204 in the divergence sensor 114.

The pressure component of a seismic wavefield in the solid subterranean medium (just below the free surface 108 of FIG. 1) is proportional to the divergence of the seismic wavefield:

$$U_p = K \nabla U, \tag{Eq. 1}$$

where U is a total wavefield in terms of displacement, and K is the bulk modulus (unit Pascal) of the medium that depends on the medium properties.

At the free surface (108), by taking into account the additional reflection-conversion at the solid-air interface, Eq. 1 can be written in the slowness domain as:

$$U_P = K \frac{2\beta^2}{\alpha^2}(p_X V_X + p_Y V_Y) \text{ with } K = \rho\left(\alpha^2 - \frac{4}{3}\beta^2\right),$$ (Eq. 2)

where $V_X$ and $V_Y$ are the velocity fields in the inline and crossline directions, and $p_X$ and $p_Y$ are the inline and crossline horizontal slownesses (inverse of the apparent velocities, or equivalently the slope of an event in the time-space domain). The inline and crossline directions are discussed in connection with FIG. 3 below. The $\alpha$, $\beta$, $\rho$ parameters are the P-wave velocity, the S-wave velocity and the density, respectively, just below the surface 108 in the vicinity of the sensor assembly.

A P-wave is a compression wave, while an S-wave is a shear wave. The P-wave extends in the direction of propagation of a seismic wave, while the S-wave extends in a direction generally perpendicular to the direction of propagation of the seismic wave.

Figure 3:
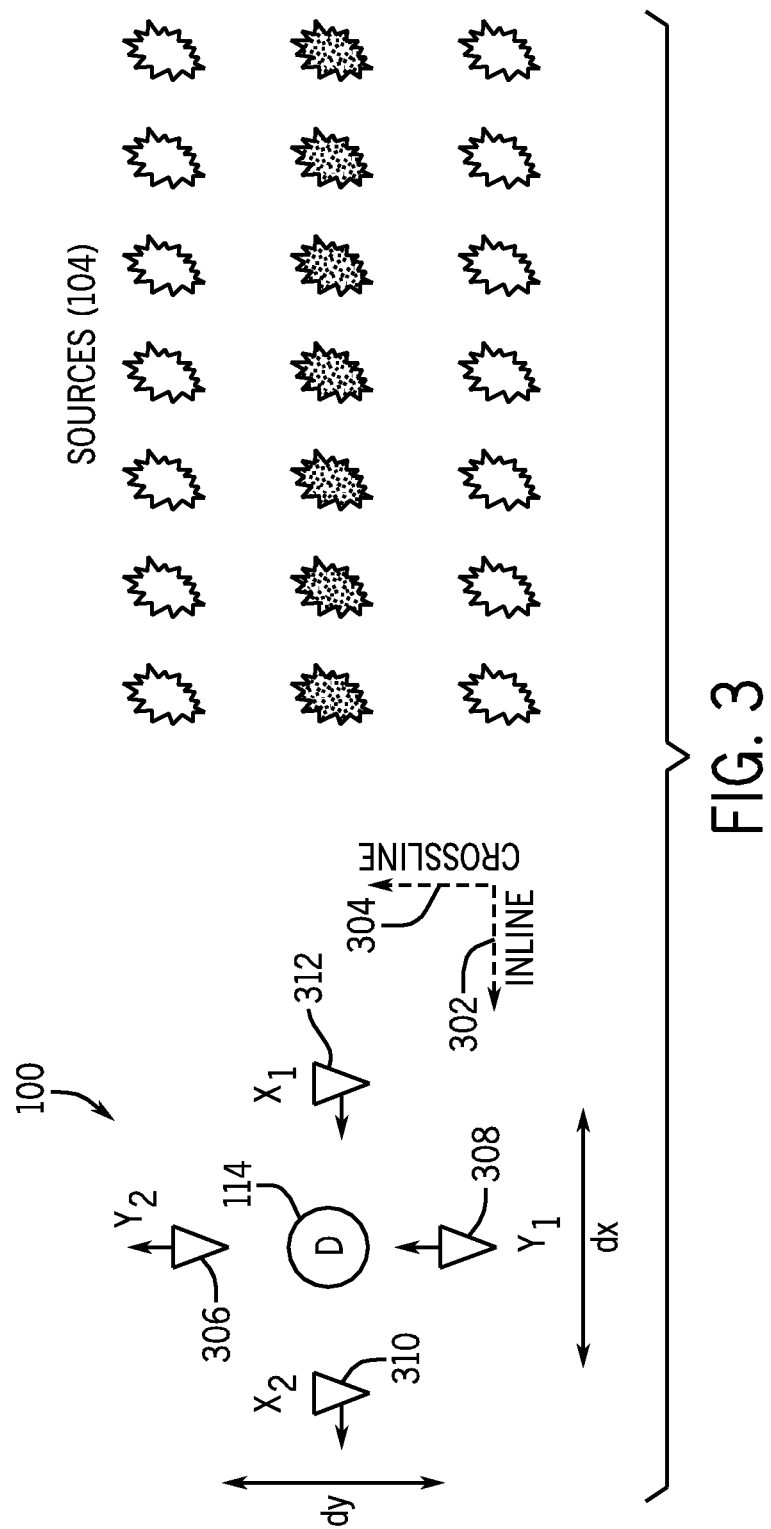
FIG. 3 is a schematic diagram of another example arrangement of a sensor assembly and seismic sources.

To illustrate the inline and crossline directions, an arrangement of a sensor assembly 100 and seismic sources 104 is shown in FIG. 3. The inline direction (x direction) is represented as 302, while the crossline direction (y direction) is represented as 304, where the inline direction (x) and crossline direction (y) are generally perpendicular to each other. As shown in FIG. 3, the sensor assembly 100 has a divergence sensor 114 (to provide output D), y-direction seismic sensors 306, 308, and x-direction seismic sensors 310 and 312. In further implementations, a z-direction seismic sensor can also be provided.

Because the pressure measured by a hydrophone (or other type of pressure sensor) located in a fluid filled container is proportional to the pressure in the surrounding medium, the following is obtained:

$$U_D = K_D U_P = K_D K_S (p_X V_X + p_Y V_Y) \text{ with}$$ (Eq. 3)

$$K_S = 2\rho\beta^2\left(1 - \frac{4}{3}\frac{\beta^2}{\alpha^2}\right),$$

where $K_S$ depends on a characteristic of the near-surface subterranean medium, and where $K_D$ (no unit) depends on the sensitivity of the sensor assembly (e.g., $K_D$ converts the pressure fluctuations outside the container into the pressure fluctuations inside the container and compensate for the fact that the divergence sensor and the seismic sensor may have different impulse responses).

Since $p_X = \delta t/\delta x$ and $p_Y = \delta t/\delta y$, Eq. 3 can be rewritten in the conventional time-space domain as:

$$\frac{\partial U_D}{\partial t} = K_D K_S \left(\frac{\partial V_X}{\partial x} + \frac{\partial V_Y}{\partial y}\right).$$ (Eq. 4)

To estimate the $K_D K_S$ term, where $K_D$ depends on the sensor sensitivity of the divergence sensor (with respect to the seismic sensors) and $K_S$ depends on the local near-surface properties, the following equations (derived from Eqs. 3 and 4) can be used:

$$K_D K_S = \frac{\partial U_D}{\partial t} \bigg/ \left(\frac{\partial V_X}{\partial x} + \frac{\partial V_Y}{\partial y}\right)$$ (Eq. 5)

$$K_D K_S = U_D/(p_X V_X + p_Y V_Y)$$ (Eq. 6)

In these equations, $V_X$ and $V_Y$ are considered to be velocity fields. If seismic sensors measure acceleration, the $U_D$ data should first be time differentiated. If seismic sensors measure displacement, the $U_D$ data should first be time integrated. In these cases, the $K_D K_S$ term can eventually be computed as a scalar coefficient. Otherwise, the $K_D K_S$ term may be a complex operator which also includes the time integration or the time differentiation effect (this can be attributed to the difference in term of impulse responses between the divergence and the seismic sensors). In the ensuing discussion, it is assumed that $V_X$ and $V_Y$ are velocity fields. In alternative implementations, the $K_D K_S$ term can be computed based on the reciprocal of the right hand-side of Eqs. 5 and 6.

The following describes a number of techniques that use Eq. 5 or 6 to estimate the calibration term $K_D K_S$ at each receiver (sensor assembly) location, considering a distribution of co-located D, X, Y sensors (in a sensor assembly 100 as shown in FIG. 3), with dx and dy representing spatial inline and crossline sampling intervals (see FIG. 3).

With a complex three-dimensional (3D) xyz-varying subterranean medium (where characteristics of the subterranean medium vary in all three dimensions x, y, z), the local $K_D K_S$ term can be obtained from the ratio between $\delta U_D/\delta t$ over $(\delta V_X/\delta x + \delta V_y/\delta y)$, according to Eq. 5, using any part of unaliased common shot gather (CSG) data (in the x-direction for $V_X(x,t)$ and in the y-direction for $V_Y(y,t)$).

Figure 4:
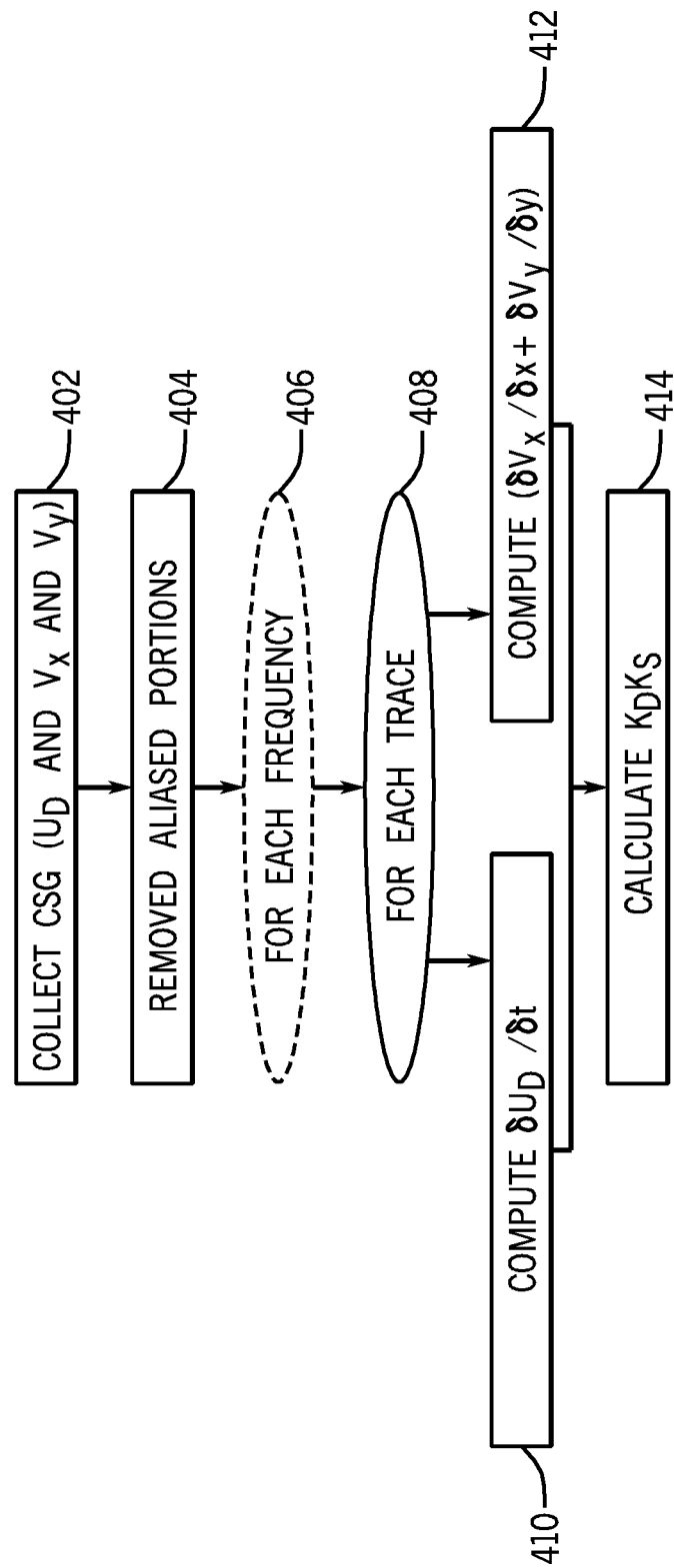
FIGS. 4-6 are flow diagrams of processes to determine a calibration term according to some embodiments.

A workflow for a 3D varying of subterranean medium according to some implementations is depicted in FIG. 4. A common shot gather (CSG) refers to a grouping of traces recorded by corresponding sensor assemblies in response to a single shot (activation of a single seismic source). The corresponding CSG data, as collected (at 402) by the sensor assemblies in response to the shot, in some implementations include $U_D$, $V_X$, and $V_Y$ (collected based on outputs of the divergence sensor and the seismic sensors, respectively). Any aliased portion of the CSG data is removed (at 404). Aliased events are removed from each of the $U_D$, $V_X$ and $V_Y$ data. Then, for each frequency (406) and for each trace (408), the derivatives $\delta U_D/\delta t$ and $(\delta V_X/\delta x + \delta V_Y/\delta y)$ are calculated (at 410 and 412, respectively) based on the CSG data with the aliased portion removed. Next, the calibration term $K_D K_S$ is computed (at 414) by taking the ratio of $\delta U_D/\delta t$ to $(\delta V_X/\delta x + \delta V_Y/\delta y)$ according to Eq. 5. Note that the $U_D$ time derivation is "optional" in some implementations (not necessary if $V_i$ is displacement for example). In addition, $K_D$ may include the derivation operator.

The workflow of FIG. 4 can be repeated for each of multiple shots.

Note that the loop over the frequency (406) can be omitted in some implementations. Computing a ratio between data of Eq. 5 in a time-space window can be performed using one of several techniques. For example, one technique involves calculating the ratio for each time sample and then taking the mean value. Alternatively, calculating the ratio can be done using cross-correlation and auto-correlation between the data. Another technique is based on principal component analysis of a covariant matrix built from cross-correlated and auto-correlated analytic signal data. The foregoing techniques enable calculation of a frequency independent ratio (a scalar number). Alternatively, the ratio can be obtained as a function of frequency (operator of several point length in the time domain), such as by using a Wiener-Levinson technique for example. Using this procedure, any shot (a single activation of a seismic source, whatever its location) can be used to determine $K_D K_S$ values over the whole receiver (sensor assembly) distribution by computing the trace-by-trace ratios in the CSG domain.

Removing the aliased part (404 in FIG. 4) can be accomplished using any one of various techniques. For example, a simple technique can include applying a low-pass filter on data to select only frequencies below a predefined maximum frequency. Alternatively, if an array of sensor assemblies is used, an F-K filter can be applied to extract the entire unaliased area, which allows selection of data with relatively low frequencies. In alternative implementations, a technique for removing an aliased portion from the CSG data can mute slow events (typically ground-roll noise), such that the minimum apparent velocity in the CSG data is larger, so that higher frequencies can be used. Yet another technique includes applying interpolation to reduce the spatial sampling, such that higher frequency content can be used.

Alternatively, a common receiver gather (CRG) technique is used instead of the CSG technique of FIG. 4. To minimize the presence of noise, it is possible to take into account several (potentially all) shots, by re-ordering the whole dataset (with aliased portion removed) in the common-receiver domain, and then computing the ratio (according to Eq. 5) to obtain the $K_D K_S$ term at the considered receiver position, where the ratio is a single scaling factor or a complex operator for the whole CRG (the ratio is not calculated in a trace-by-trace manner). A common receiver gather (CRG) refers to the seismic data acquired by a particular receiver (sensor assembly) for multiple shots (activations of multiple seismic sources).

Figure 5:
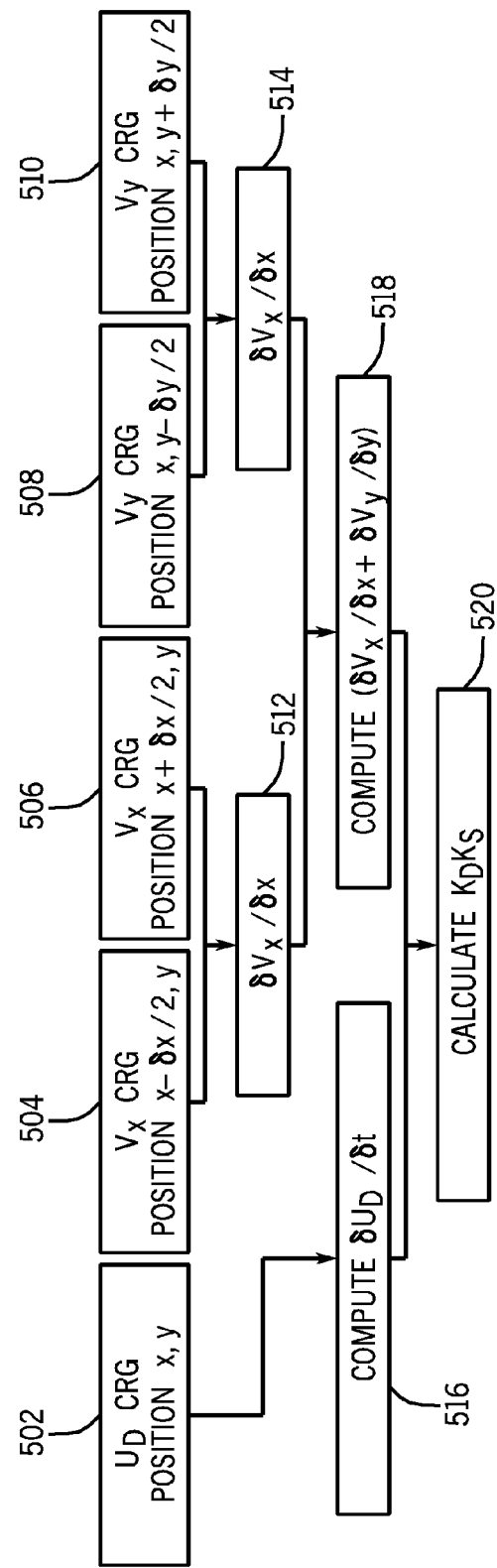

The workflow corresponding to calculating the ratio of spatial derivatives (according to Eq. 5) in the common receiver domain is depicted in FIG. 5. FIG. 5 depicts the collection (at 502) of $U_D$ CRG data for a sensor assembly at position x, y. Moreover, FIG. 5 depicts the collection (at 504) of $V_X$ CRG data at a sensor assembly at position x−δx/2, y, and the collection (at 506) of $V_X$ CRG data at position x+δx/2, y. Moreover, the FIG. 5 workflow collects (at 508) $V_Y$ CRG data at position x, y−δy/2, and collects (at 510) $V_Y$ CRG data at position x, y+δy/2.

Based on the $V_X$ CRG data collected at 504, 506, the spatial derivative $\delta V_X/\delta x$ is calculated (at 512). Similarly, from the $V_Y$ CRG data collected at 508, 510, the spatial derivative $\delta V_Y/\delta y$ is calculated (at 514).

In some implementations, the optional time derivative $\delta U_D/\delta t$ is computed (at 516) from the $U_D$ CRG data collected at 502, while $(\delta V_X/\delta x + \delta V_Y/\delta y)$ is computed (at 518) from the spatial derivatives calculated at 512, 514.

Based on the computed values at 516, 518, the calibration term $K_D K_S$ is calculated (at 520) according to the Eq. 5.

The FIG. 5 workflow is repeated for all sensor assemblies 100 in the distribution. Here the CRG data can eventually be trace-by-trace scaled-normalized (with the same scaling applied on both $\delta U_D/\delta t$ and $(\delta V_X/\delta x + \delta V_Y/\delta y)$ in order to prevent the ratio from being predominantly estimated from the strongest amplitude shots (short offset data, i.e., data collected by sensor assemblies close to respective seismic sources).

In alternative implementations, the $K_D K_S$ term is calculated based on the ratio of $\delta U_D/\delta t$ to either $\delta V_X/\delta x$ or $\delta V_Y/\delta y$—in other words, only inline or crossline seismic data is used. If the $K_D K_S$ term is calculated based on the ratio of $\delta U_D/\delta t$ to $\delta V_X/\delta x$ (where $V_X$ is the inline velocity field), then the computation focuses on the unaliased part of $V_X$, after removal of events that are scattered off the xz plane from both the divergence data $U_D$ and inline velocity field V. The xz plane includes the x (inline) direction and the generally vertical (z) direction.

On the other hand, if the $K_D K_S$ term is calculated based on the ratio of $\delta U_D/\delta t$ to $\delta V_Y/\delta y$ (where $V_Y$ is the crossline velocity field), then the computation focuses on the unaliased part of $V_Y$, after removal of events that are scattered off the yz plane from both the divergence data $U_D$ and crossline velocity field $V_Y$. The yz plane includes the y (crossline) direction and the generally vertical (z) direction.

The techniques discussed according to FIGS. 4 and 5 assume a 3D varying subterranean medium. Alternatively, the subterranean medium has varying characteristics in two dimensions (2D varying subterranean medium), namely the x and z dimensions. In this scenario, the subterranean medium can be assumed to be invariant in the y dimension. With the 2D varying medium assumption, the technique of FIG. 4 can be simplified (by using trace-by-trace ratio in CSGs) or the technique of FIG. 5 can be simplified (by using global ratio between CRGs). The simplified techniques are able to derive the calibration term $K_D K_S$ using only inline shots (along the x-direction). In this case, the contribution of $\delta V_Y/\delta y$ can be neglected and the $K_D K_S$ value(s) can be obtained from the $\delta U_D/\delta t$ over $\delta V_X/\delta x$ ratio directly (Eq. 5 with the $\delta V_Y/\delta y$ term set to zero). The advantage here is that the relatively dense y-sampling criteria is not required. Note that this approach can also be applied in the additional presence of offline scattering structures (off the xz-plane), on the extra condition that the scattered events are previously identified and muted (both from $U_D$ and $V_S$), before computing the ratio of Eq. 5 (with $\delta V_Y/\delta y$ disregarded). Off-line scattering structures refer to any subterranean structures that are offset from a line between the seismic source and the sensor assemblies along the x direction (in the xz-plane), where the scattering structures can cause reflection of seismic waves.

Another type of 2D varying subterranean medium assumes that the subterranean medium varies in only the y and z dimensions, and is x-invariant. In this scenario, the FIG. 4 technique is simplified by using trace-by-trace ratio in CSGs or the FIG. 5 technique is simplified by using global ratio between CRGs. The calibration $K_D K_S$ term can be derived using only crossline shots (along the y-direction). In this case, the contribution of $\delta V_X/\delta x$ according to Eq. 5 can be neglected and the $K_D K_S$ value(s) can be obtained from the $\delta U_D/\delta t$ over $\delta V_Y/\delta y$ ratio directly. The advantage here is that the relatively dense x-sampling criteria is not required. Note that this approach can also be applied in the additional presence of offline scattering structures (off the yz-plane), on the extra condition that the scattered events are previously identified and muted (both from $U_D$ and $V_Y$), before computing the ratio of $\delta U_D/\delta t$ to $\delta V_Y/\delta y$.

The above described techniques can be applied to the entire recording length of the sensor assembly array, without any specific event selection (except in terms of aliasing in the common-shot domain and eventually offline scattered events for the simplified techniques for 2D varying medium). In other words, the processed part of the data can contain several P waves, several S waves, as well as ground-roll events (overlapping or not, all with different amplitudes, velocities and emergent angles).

The above mentioned techniques can be used to calibrate the divergence sensor using (only) the four closely located (adjacent) seismic sensors (eventually only two seismic sensors considering only inline or crossline events). In other words, receiver arrays are not necessary. Alternatively, it is also possible to take advantage of seismic arrays using Eq. 6.

In this latter case, the quantity $p_x V_X$ and $p_y V_Y$ can be automatically determined for example by mapping the seismic data ($V_X$ and $V_Y$, CSGs) in the tau-p domain (where tau is intercept time, and p is horizontal slowness), then multiplying the transformed data by the known $p_x$ and $p_y$ values (respectively, in the slowness domain) and then transforming back the data in the conventional time-offset domain. Finally, the $K_D K_S$ term is obtained by computing the ratio of Eq. 6. In this procedure, again, the aliased part of the data should not be considered, and a simplified version can be derived by considering only inline events (typically inline shots, such that the $p_y V_Y$ contribution can be disregarded) or only crossline events (typically crossline shots, such that the $p_x V_X$ contribution can be disregarded). Here the tau-p transform is used, but note that F-K transform can be used in a similar way.

To simplify the foregoing calculations, one of the first and second products ($p_x V_X$ or $p_y V_Y$) can be disregarded to simplify computing the calibration term. For example, the $p_y V_Y$ product is set to zero for pure inline events (typically for inline shots), and the $p_x V_X$ product is set to zero for pure crossline events (typically for crossline shots).

Once again, this process allows the determination of the calibration term distribution (at each receiver location) using a single shot, but the process can be repeated for several shots (potentially all) to better constrain the results. In such case, the ratio of Eq. 6 can be determined in the common-receiver domain as explained in the text accompanying FIG. 5 above, while the $p_i V_i$ components are computed by forward-inverse tau-p transform of the corresponding CSGs.

The foregoing techniques require unaliased data. However, if the spatial sampling is not dense enough it is possible to focus on (eventually aliased) specific events. With this alternative procedure, the investigated seismic wave can be any of a P wave, an S wave or a Rayleigh wave, but they have to be pure events (i.e. events that do not overlap with other waves) such that the corresponding horizontal slownesses ($p_x$ and $p_y$) can be measured. Here, array(s) of sensor assemblies are also used to estimate the slownesses at each sensor assembly position, but the non-aliasing criteria can be relaxed (at least for non-dispersive events).

Figure 6:
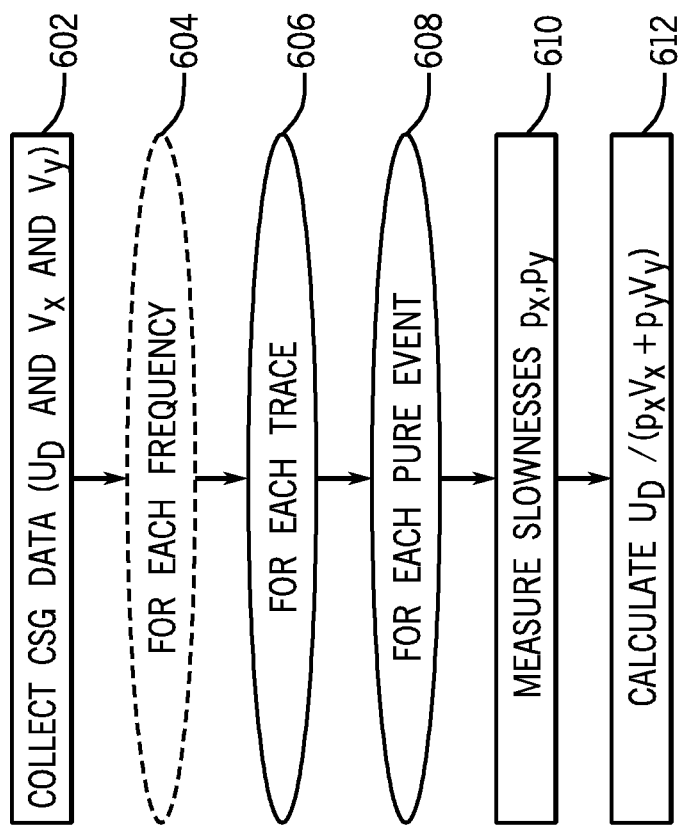

In a scenario with a 3D varying subterranean medium, the $K_D K_S$ term can be evaluated from the ratio between co-located divergence data and horizontal seismic data for any kind of waves of known horizontal slownesses ($p_x$, $p_y$)—slownesses of pure events. Once the horizontal slownesses are measured, the $K_D K_S$ term at a given sensor assembly location is obtained by calculating the local $U_D/(p_x V_X + p_y V_Y)$ ratio, according to Eq. 6, in the corresponding time-window. The workflow according to some implementations for the foregoing technique is depicted in FIG. 6. CSG data (including $U_D$, $V_X$, and $V_Y$) are collected (at 602). Then, for each frequency (604), for each trace (606), and for each pure event (608), the horizontal slownesses, $p_x$, $p_y$, are measured (at 610). Based on the slownesses $p_x$, $p_y$ and the collected CSG data ($U_D$, $V_X$, and $V_Y$), the $K_D K_S$ term is calculated according to Eq. 6 (at 612).

A simplified version of the FIG. 6 workflow can be used in the case of 2D varying subterranean medium (y-invariant medium, or a representation of the medium after removal of crossline propagating events). A first simplified technique uses inline shots only along the x-direction. The $K_D K_S$ term can be evaluated from the ratio between co-located $U_D$ and $V_X$ data for any kind of pure event of known horizontal slowness ($p_x$): $K_D K_S = U_D/(p_x V_X)$.

Another type of 2D varying subterranean medium is x-invariant 2D varying medium, or a medium for which inline propagating events have been removed. A second simplified version of the FIG. 6 technique uses only crossline shots (along the y-direction). The $K_D K_S$ term can be evaluated from the ratio between co-located $U_D$ and $V_Y$ data for any kind of pure event of known horizontal slowness ($p_y$): $K_D K_S = U_D/(p_y V_Y)$.

For the FIG. 6 technique or simplified versions thereof, an assumption is made that the near-surface properties are homogeneous between the sensor assemblies that are used to determine the $p_x$ and $p_y$ values.

The FIG. 6 technique or simplified versions thereof, are applied in the common-shot domain in order to measure the slowness(es) at the receiver side. In addition various pure events (typically the first break or the ground-roll), can potentially be used to estimate $K_D K_S$ at the receiver locations in each CSG. Therefore, an inversion procedure (least square for example) may be implemented to integrate all the results obtained from several events in several shot gathers but at a given receiver location. In other words, when simultaneously solved for multiple shots and/or windowed events, a system of linear equations may be solved (as a least squares problem for example).

Finally, note that the isolation of pure event(s) can sometime be tricky, especially with complex data. Therefore a pre-processing step (like F-K filtering for example) may be performed in order to separate events prior to further processing to calculate the $K_D K_S$ term.

In the foregoing discussion, reference has been made to 3D and 2D varying media. Further simplification of techniques for computing the $K_D K_S$ term can be achieved in the case of a one dimensional (1D) varying medium, in which characteristics of the subterranean medium varies only in one direction (e.g., in the z or vertical direction).

In a one dimensional (1D) varying medium, the $K_D K_S$ term can be estimated in the tau-$p_x$-$p_y$ domain, from the ratio $U_D(\text{tau}, p_x, p_y)$ over $(p_x V_X(\text{tau}, p_x, p_y) + p_y V_Y(\text{tau}, p_x, p_y))$, taking into account all the shots (if processing in common-receiver domain), or equivalently all the sensor assemblies (if processing in the common-shot domain). As noted above, tau represents intercept time. Alternatively, the $K_D K_S$ term at the sensor assembly positions is given by the $U_D(\text{tau}, p_x)$ over $p_x V_X(\text{tau}, p_x)$ ratio, if only inline events are used. Alternatively, the $K_D K_S$ value at the sensor assembly position(s) is given by the $U_D(\text{tau}, p_x)$ over $p_y V_Y(\text{tau}, p_x)$ ratio, if only crossline events are used. Using such a 1D approach, the ratio can be obtained without any slowness measurement or time windowing (but it is better to focus on tau-$p_x$-$p_y$ windows with relatively good signal-to-noise ratio, typically at large slownesses). Note that a similar procedure can be derived in the F-K domain.

In all the previous cases, several sensor assemblies are employed either to compute the spatial derivatives (for Eq. 5 computation), or to measure slownesses (Eq. 6 computation). In alternative implementations, the following technique is applicable for very sparse data, even in a challenging one-shot, one-receiver case.

In the F-K domain, the ratio of pressure over horizontal displacement can be written as:

$$\frac{U_D}{U_x} = i K_D K_S k_R, \quad \text{(Eq. 7)}$$

where $k_R$ is the phase-velocity of the Rayleigh wave. After taking the derivative with respect to frequency, the following is obtained:

$$\frac{\partial \frac{U_D}{U_x}}{\partial \omega} = iK_D K_S \frac{\partial k_R}{\partial \omega} \quad \text{(Eq. 8)}$$

$$\left[\frac{\partial \frac{U_D}{U_x}}{\partial \omega}\right] = iK_D K_S c_g^{-1} \quad \text{(Eq. 9)}$$

Eq. 9 shows that the angular frequency (ω) derivative of the ratio of the pressure and displacement is equal to $K_D K_S$ divided by the group velocity ($c_g$) of the Rayleigh wave. The group velocity of a wave is the velocity with which the overall shape of the wave's amplitudes—known as the modulation or envelope of the wave—propagates through space. The group velocity ($c_g$) may be obtained by a technique that uses only a single receiver, such as the Frequency Time Analysis (FTAN) technique (which is insensitive to aliasing). The group velocity ($c_g$) determined this way is the average group-velocity between source and receiver. An extension of this technique can include group-velocity measurement made between various sources and receivers resulting in a 2D map of the local group velocities to provide a 2D model of $K_D K_S$ term, without the need to satisfy a sampling or aliasing criterion.

As already pointed out, when simultaneously solved for multiple shots and/or windowed events the resulting system of equations may be solved as a least squares problem. In such an approach $K_D K_S$ term may be solved in a frequency dependent or frequency independent manner.

The above procedures can be applied for each frequency independently, giving a pseudo-depth image of the $K_D K_S$ term (1D, 2D or 3D depending on the sensor assembly distribution). Typically, high frequencies (small wavelengths) are more sensitive to the very near-surface properties than low frequencies (longer wavelengths). In other words, $K_D K_S$ may be solved in a frequency independent manner (solve for a scalar), or frequency dependent manner (solve for an operator, several point length in time).

If the calibration term $K_D$ is already known, then it is possible to estimate the near-surface property term $K_S$ at each receiver location, eventually as a function of pseudo-depth if the process is applied for each frequency independently. Near-surface properties are particularly useful for noise characterization, shallow drilling hazard detection, depth imaging, P-S wavefield separation, static corrections, and so forth.

If the calibration term $K_D$ is unknown but is assumed to be constant for each sensor assembly (i.e. constant calibration and constant coupling along the sensor assembly distribution), it is possible to estimate the lateral variations $\Delta K_S$ along the receiver distribution, eventually as a function of pseudo-depth if the process is applied for each frequency. Lateral variations of the near-surface properties are particularly useful for noise characterization, shallow drilling hazard, depth imaging, static corrections, and so forth.

Alternatively, the near-surface property term $K_S$ may be already known using various techniques to previously determine α, β and ρ, (parameters discussed above in connection with Eq. 2). Examples of such techniques include tomography inversion for α, P-wave polarization analysis or ground-roll phase velocity inversion for β, empirical relations techniques, or others. Once $K_S$ is known, if a $K_D K_S$ frequency dependent solution has been obtained, one can obtain an estimate for the operator $K_D$. Assume that $K_S$ is a scalar (not dependent on frequency), it is possible to derive the spectral shape of $K_D(f)$.

As noted above, $K_D$ can include a calibration term $K_{cal}$ and a coupling term $K_{coup}$; thus, once $K_D(f)$ is determined, if $K_{cal}$ is a priori known, $K_{coup}(f)$ as a function of frequency can be obtained. Reciprocally, if coupling is assumed to be perfect ($K_{coup}=1$), then the calibration operator $K_{cal}(f)$ can be obtained.

Instructions of software described above (including the software 120 of FIG. 1) are loaded for execution on a processor (such as 122 in FIG. 1). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs).

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving divergence data from a divergence sensor and seismic data from seismic sensors, wherein the divergence sensor and seismic sensors are part of a sensor assembly, and wherein the seismic data includes an inline propagating wavefield and a crossline propagating wavefield;
    determining a first product of inline horizontal slowness and the inline propagating wavefield using forward and inverse tau-p transform or F-K transform in an inline direction;
    determining a second product of crossline horizontal slowness and the crossline wavefield using forward and inverse tau-p transform or F-K transform in the crossline direction; and
    computing, by one or more processors, a calibration term by taking a ratio of the divergence data to a sum of the first and the second products, wherein the calibration term includes a first parameter that is related to a characteristic of the sensor assembly, and a second parameter that is related to a characteristic of a near-surface subterranean medium.

2. The method of claim 1, further comprising disregarding one of the first and second products to simplify computing the calibration term, wherein the second product is set to zero for pure inline events, and wherein the first product is set to zero for pure crossline events.

3. An article comprising at least one non-transitory computer-readable storage medium storing instructions that upon execution by a computer system cause the computer system to:
receive divergence data from a divergence sensor and seismic data from seismic sensors, wherein the divergence sensor and seismic sensors are part of a sensor assembly, and wherein the seismic data includes an inline propagating wavefield and a crossline propagating wavefield; and
compute a $K_D K_S$ term by taking a ratio of the divergence data to one or a combination of a first product of the inline propagating wavefield and a first slowness, and a second product of the crossline propagating wavefield and a second slowness, wherein the $K_D K_S$ term includes a first parameter $K_D$ that is related to a characteristic of the sensor assembly, and a second parameter $K_S$ that is related to a characteristic of a near-surface subterranean medium.

4. A computer system comprising:
a storage media to store divergence data received from a divergence sensor and seismic data received from seismic sensors, wherein the divergence sensor and seismic sensors are part of a sensor assembly, and wherein the seismic data includes an inline propagating wavefield and a crossline propagating wavefield; and
one or more processors configured to:
determine a first slowness in an inline direction;
determine a second slowness in a crossline direction; and
compute a calibration term by taking a ratio of the divergence data to a sum of a first product of the first slowness and the inline propagating wavefield, and a second product of the second slowness and the crossline propagating wavefield, wherein the calibration term includes a first parameter that is related to a characteristic of the sensor assembly, and a second parameter that is related to a characteristic of a near-surface subterranean medium.

5. The computer system of claim 4, wherein the one or more processors are configured to further disregard one of the first and second products to simplify computing the calibration term, wherein the second product is set to zero for pure inline events, and wherein the first product is set to zero for pure crossline events.

6. A method comprising:
receiving divergence data from a divergence sensor and seismic data from seismic sensors, wherein the divergence sensor and seismic sensors are part of a sensor assembly, wherein the divergence sensor comprises a container filled with a material, and a pressure sensor immersed in the material, and wherein the seismic data comprises velocity or acceleration;
computing, by one or more processors, a spatial derivative of the seismic data;
computing, by the one or more processors, a ratio of a value derived from the divergence data to a value derived from the spatial derivative of the seismic data; and
computing, by the one or more processors, a calibration term using the ratio, wherein the calibration term includes a first parameter that is related to a characteristic of the sensor assembly, and a second parameter that is related to a characteristic of a near-surface subterranean medium.

7. The method of claim 6, wherein the divergence sensor and the seismic sensors are contained within a housing of the sensor assembly.

8. The method of claim 6, wherein the first parameter is dependent on an impulse response and a coupling of the sensor assembly with the near-surface subterranean medium.

9. The method of claim 6, wherein the calibration term is derived from a product of the first and second parameters.

10. The method of claim 6, wherein the seismic data includes horizontal seismic data.

11. The method of claim 6, wherein the sensor assembly is part of a distribution of sensor assemblies, and wherein each of the sensor assemblies in the distribution includes a divergence sensor and seismic sensors, the method further comprising:
receiving divergence data and seismic data from each of the sensor assemblies as part of a common shot gather, wherein the calibration term over the distribution of sensor assemblies is computable from a single shot.

12. The method of claim 6, wherein the seismic data comprises inline seismic data and crossline seismic data,
wherein the value derived from the spatial derivative of the seismic data is a sum of a spatial derivative of the inline seismic data and a spatial derivative of the crossline seismic data.

13. The method of claim 12, wherein computing the calibration term is based on the seismic data obtained for a three-dimensional varying subterranean medium.

14. The method of claim 6, wherein the divergence data and the seismic data are part of one or more common receiver gathers in which the divergence data and seismic data are responsive to multiple activations of corresponding seismic sources, and wherein computing the calibration term comprises computing the calibration term based on data of the one or more common receiver gathers.

15. The method of claim 14, further comprising reordering the divergence data and seismic data that are part of a common shot gather to provide the one or more common receiver gathers.

16. The method of claim 6, wherein the seismic data comprises inline seismic data and crossline seismic data,
wherein the value derived from the spatial derivative of the seismic data is a spatial derivative of the inline seismic data in an x direction, wherein the inline seismic data has been processed to remove events scattered off an xz plane, wherein the xz plane is a plane including the x direction and a z direction that is generally vertical.

17. The method of claim 16, wherein computing the calibration term is based on the seismic data obtained for a three-dimensional varying subterranean medium or a two-dimensional varying subterranean medium.

18. The method of claim 6, wherein the seismic data comprises inline seismic data and crossline seismic data,
wherein the value derived from the spatial derivative of the seismic data is a derivative of the crossline seismic data in a y direction, wherein the crossline seismic data has been processed to remove events scattered off an yz plane, wherein the yz plane is a plane including the y direction and a z direction that is generally vertical.

19. The method of claim 18, wherein computing the calibration term is based on the seismic data obtained for a three-dimensional varying subterranean medium or a two-dimensional varying subterranean medium.

20. The method of claim 6, further comprising removing aliased portions of the divergence data and the seismic data prior to performing the computing of the spatial derivative, the computing of the ratio, and the computing of the calibration term.

21. The method of claim 6, further comprising:
responsive to one of the first parameter and second parameter being known, computing the other of the first parameter and the second parameter based on the known first or second parameter and the computed calibration term.

22. The method of claim 21, wherein computing the second parameter based on the known first parameter and the computed calibration term comprises computing the second parameter as a function of frequency.

23. A computer system comprising:
at least one processor to:
receive divergence data from a divergence sensor and seismic data from seismic sensors, wherein the divergence sensor and seismic sensors are part of a sensor assembly, wherein the divergence sensor comprises a container filled with a material, and a pressure sensor immersed in the material, and wherein the seismic data comprises velocity or acceleration;
compute a spatial derivative of the seismic data;
compute a ratio of a value derived from the divergence data to a value derived from the spatial derivative of the seismic data; and
compute a calibration term using the ratio, wherein the calibration term includes a first parameter that is related to a characteristic of the sensor assembly, and a second parameter that is related to a characteristic of a near-surface subterranean medium.

24. The computer system of claim 23, wherein the first parameter is dependent on an impulse response and a coupling of the sensor assembly with the near-surface subterranean medium, and wherein the calibration term is derived from a product of the first and second parameters.

25. The computer system of claim 24, wherein the seismic data comprises inline seismic data and crossline seismic data, wherein the value derived from the spatial derivative of the seismic data is a sum of a spatial derivative of the inline seismic data and a spatial derivative of the crossline seismic data.

* * * * *